Jan. 23, 1962 W. A. O'BERRY 3,018,385

LOW LEVEL ASYMMETRICAL TRANSISTOR CHOPPER

Filed June 13, 1960

INVENTOR.
WILLIAM A. O'BERRY
BY
H. H. Losche
Paul S. Collignon
ATTORNEYS

United States Patent Office 3,018,385
Patented Jan. 23, 1962

3,018,385
LOW LEVEL ASYMMETRICAL TRANSISTOR CHOPPER

William A. O'Berry, Glen Burnie, Md., assignor, by mesne assignments, to the United States of America as represented by the Secretary of the Navy Filed June 13, 1960, Ser. No. 35,855
3 Claims. (Cl. 307—88.5)

The present invention relates to a transistor chopper and more particularly to a transistor chopper for determining low level direct current output changes.

In the use of passive crystal video receivers, it is desired to accurately determine low level direct current output changes, at the crystal, due to received continuous wave energy. Moderate input impedance of the order of the detector crystal dynamic impedance is desired without adding drift to the input direct current level. It is these drift considerations that preclude the use of an input cathode follower. Also, low output impedance is desired since the input impedance to the video amplifiers is low.

In the present invention, a balanced symmetrical chopper is provided along with a symmetrical square wave chopping signal. The direct current level to be chopped is smoothed by a capacitor which provides a low impedance source for a pulse forming network. When the square wave goes positive, the balanced symmetrical chopper is biased on, and the pulse forming network discharges through a load in a pulse. A transistor is provided between the capacitor and the pulse forming network, and during the application of the positive square wave chopping signal, this transistor is biased off thus disconnecting the output from the direct current input. When the square wave goes negative and the chopper is switched off, the transistor is switched on and the pulse forming network is charged from the capacitor.

An object of the present invention is to provide means for chopping a low level direct current output into video pulses to allow the use of existing video amplifiers for continuous wave measurement.

Figure 1:
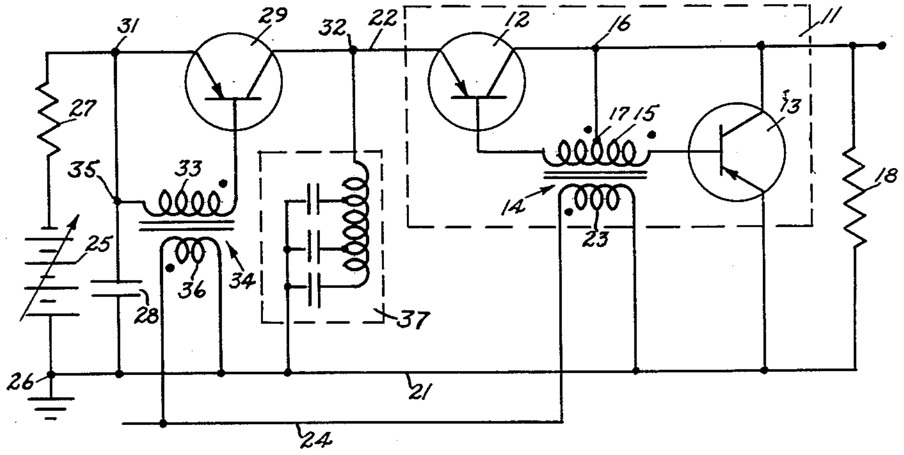
Figure 2:
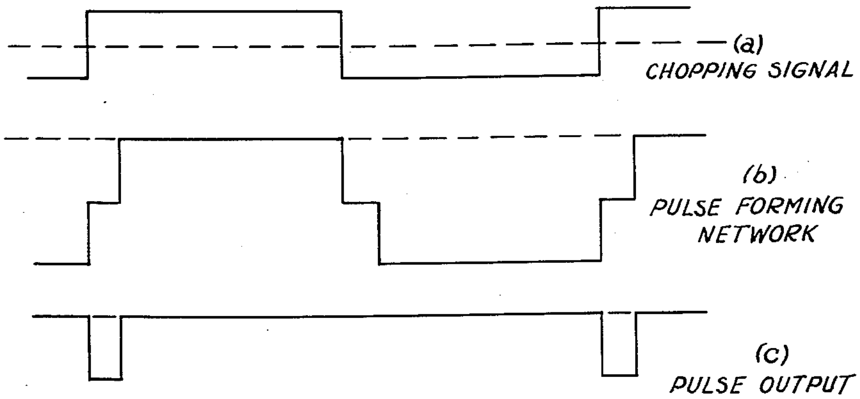

Other objects and advantages of this invention will be readily appreciated as the same becomes better understood by reference to the following detailed description when considered in connection with the accompanying drawing wherein:

FIG. 1 is a schematic representation of one embodiment of the present invention; and FIG. 2 is a graph showing voltages and time relations.

Referring now to the drawing, and particularly to FIG. 1, there is shown a balanced symmetrical chopper 11 having transistors 12 and 13 and transformer 14. Transistors 12 and 13 have the customary collector, emitter, and base electrodes, with the base electrodes being connected to opposite ends of the secondary winding 15 of transformer 14. The collectors of transistors 12 and 13 are connected to common point 16, which is connected to center-tap 17 of secondary winding 15. Load 18 is connected across leads 21 and 22, as shown, and a square wave chopping signal is applied to the primary winding 23 of transformer 14 by means of leads 21 and 24. While many transistor choppers suffer from the effects of residual voltage, or feedthrough voltage, the voltages from transistors 12 and 13 tend to cancel each other and thus providing a nearly ideal low-level chopper. On one half-cycle of the chopping frequency, transistor 13 is open and transistor 12 is closed, completing the circuit from the input through transistor 12 and to load 18. On the alternate half-cycle, transistor 12 is open and transistor 13 is closed, effectively short-circuiting the load 18.

The positive terminal of a source of direct current 25 is connected to point 26, which is common to ground and lead 21, and the negative terminal of direct current 25 is connected to lead 22 through resistor 27. Capacitor 28 is connected across leads 21 and 22. Transistor 29 is connected in lead 22 with the emitter electrode being connected to common point 31 and the collector electrode being connected to common point 32. The base electrode of transistor 29 is connected to one end of the secondary winding 33 of transformer 34, with the other end of winding 33 being connected to point 35, which is common to one lead of capacitor 28. The primary winding 36 of transformer 34 is connected to the square wave chopping signal. A pulse forming network 37, well-known to those skilled in the art, is connected across leads 21 and 22.

In operation, the direct current level, which is supplied by source 25 and is to be chopped, is smoothed by capacitor 28, which also provides a low impedance source for the pulse forming network 37. Referring now to FIG. 2 of the drawing, which shows the important voltage and time relations, it can be seen that when the square wave goes positive, the chopper 11 is biased on and the pulse forming network discharges through the load 18 in a pulse. During this time, transistor 29 is biased off, thus disconnecting the output from the direct current source 25. When the square wave goes negative, chopper 11 is switched off, transistor 29 is switched on, and the pulse forming network 37 is charged from capacitor 28.

It can thus be seen that the present invention provides a novel means for chopping a low level direct current output into video pulses to allow the use of existing video amplifiers for continuous wave measurement.

Obviously many modifications and variations of the present invention are possible in the light of the above teachings. It is therefore to be understood, that within the scope of the appended claims, the invention may be practiced otherwise than as specifically described.

What is claimed is:

1. A low level asymmetrical transistor chopper comprising:
(*a*) a source of direct current voltage to be chopped,
(*b*) a first transistor having emitter, collector and base electrodes,
(*c*) a symmetrical chopper comprised of a pair of junction transistors, each having emitter, collector and base electrodes, and a transformer having a primary and a secondary winding, said base electrodes of said junction transistors being connected to different ends of said secondary winding,
(*d*) said first transistor and said symmetrical chopper being connected in series with said source,
(*e*) a source of square wave chopping voltage connected to said base electrode of said first transistor and to said primary winding of said transformer,
(*f*) a pulse forming network shunted across said direct current source, and
(*g*) a means for charging said pulse forming network when said chopper is in an off condition.

2. A low level asymmetrical transistor chopper comprising:
(*a*) a source of direct current voltage to be chopped,
(*b*) a capacitor shunted across said source of direct current voltage,
(*c*) a switching transistor having emitter, collector and base electrodes,
(*d*) a symmetrical chopper comprised of a pair of junction transistors, each having emitter, collector and base electrodes, and a first transformer having a primary and a secondary winding, said base electrodes of said junction transistors being connected to different ends of said secondary winding, (*e*) said first transistor and said symmetrical chopper being connected in series with said source, (*f*) a second transformer having a primary and a secondary winding, said secondary winding of said second transformer having one end connected to said base electrode of said switching transistor and the other end connected to a point common to one end of said capacitor, (*g*) a source of square wave chopping voltage connected to said primary windings of said first and second transformers, and (*h*) a pulse forming network shunted across said direct current source.

3. A low level asymmetrical transistor chopper as set forth in claim 1 wherein said means for charging said pulse forming network comprises a capacitor shunted across said source of direct current voltage.

References Cited in the file of this patent

UNITED STATES PATENTS

| | | |
|---|---|---|
| 2,470,895 | Marlowe et al. | May 24, 1949 |
| 2,596,142 | Gerwin | May 13, 1952 |
| 2,697,784 | Blythe | Dec. 21, 1954 |
| 2,698,900 | Anger | Jan. 4, 1955 |